(12) United States Patent
Gudivada et al.

(10) Patent No.: US 11,676,423 B1
(45) Date of Patent: Jun. 13, 2023

(54) SYSTEM FOR MANAGING A FINGERPRINT SENSOR

(71) Applicant: QUALCOMM Incorporated, San Diego, CA (US)

(72) Inventors: Naga Chandan Babu Gudivada, Hyderabad (IN); Rakesh Pallerla, Hyderabad (IN); Prakash Tiwari, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/661,234

(22) Filed: Apr. 28, 2022

(51) Int. Cl.
*G06V 40/12* (2022.01)
*G06V 40/50* (2022.01)
*G06F 3/14* (2006.01)
*G06V 40/13* (2022.01)

(52) U.S. Cl.
CPC ............. *G06V 40/50* (2022.01); *G06F 3/14* (2013.01); *G06V 40/1306* (2022.01); *G06V 40/1347* (2022.01)

(58) Field of Classification Search
CPC .............. G06V 40/50; G06V 40/1306; G06V 40/1347; G06F 3/14
See application file for complete search history.

(56) References Cited

U.S. PATENT DOCUMENTS

| 2017/0060316 A1* | 3/2017 | Larson | G06F 3/0488 |
| 2020/0264756 A1* | 8/2020 | Jin | G06V 40/13 |
| 2021/0133422 A1* | 5/2021 | Lee | G06V 40/13 |

* cited by examiner

*Primary Examiner* — Jonathan A Boyd
(74) *Attorney, Agent, or Firm* — Qualcomm Incorporated

(57) ABSTRACT

Some disclosed methods involve maintaining a data structure that includes historical fingerprint location data. The historical fingerprint location data may include information corresponding to prior instances of fingerprint image data obtained from each of a plurality of fingerprint sensor areas. Some such methods involve identifying, based at least in part on the historical fingerprint location data, a selected fingerprint sensor area, providing a user prompt to place a digit within or on the selected fingerprint sensor area, and obtaining current fingerprint image data of the digit from the selected fingerprint sensor area. In some examples, the historical fingerprint location data indicate a number of prior instances during which prior fingerprint image data has been obtained from each fingerprint sensor area of the plurality of fingerprint sensor areas. In some such examples, the identifying is based, at least in part, on the number of prior instances.

27 Claims, 8 Drawing Sheets

| Fingerprint Sensor Area | Total Number of Prior Attempts to Obtain Fingerprint Image Data | Number of Prior Successful Attempts to Obtain Fingerprint Image Data | Number of Prior Unsuccessful Attempts to Obtain Fingerprint Image Data | Success Ratio |
|---|---|---|---|---|
| A | | | | |
| B | | | | |
| C | | | | |
| D | | | | |
| E | | | | |
| F | | | | |
| G | | | | |
| H | | | | |
| I | | | | |

*Figure 4*

SYSTEM FOR MANAGING A FINGERPRINT SENSOR

TECHNICAL FIELD

This disclosure relates generally to methods, apparatus and systems for controlling devices that include fingerprint sensors.

DESCRIPTION OF THE RELATED TECHNOLOGY

Biometric sensors, including fingerprint sensors, have become common features of modern life. Although some existing methods for controlling fingerprint sensors provide acceptable performance under some conditions, improved methods and devices would be desirable.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. According to some examples, the apparatus may be integrated into a mobile device. In some examples, the apparatus may include a display, a fingerprint sensor system and a control system configured for communication with (such as electrically or wirelessly coupled to) the fingerprint sensor system and the display. In some examples, the control system may include a memory, whereas in other examples the control system may be configured for communication with a memory that is not part of the control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

According to some examples, the control system may be configured to access a data structure that includes historical fingerprint location data. In some examples, the historical fingerprint location data may include information corresponding to prior instances of fingerprint image data obtained from each fingerprint sensor area of a plurality of fingerprint sensor areas of the fingerprint sensor system. In some examples, the control system may be configured to identify, based at least in part on the historical fingerprint location data, a selected fingerprint sensor area of the plurality of fingerprint sensor areas. According to some examples, the control system may be configured to control the display to prompt, via at least one visual notification on the display, a user to place a digit within or on the selected fingerprint sensor area. In some examples, the control system may be configured to obtain, via the fingerprint sensor system, current fingerprint image data of the digit from the selected fingerprint sensor area.

In some examples, the historical fingerprint location data may indicate a number of prior instances during which prior fingerprint image data has been obtained from each fingerprint sensor area of the plurality of fingerprint sensor areas. In some such examples, the control system may be configured to identify the selected fingerprint sensor area based, at least in part, on the number of prior instances.

According to some examples, the historical fingerprint location data may indicate a success ratio S/T for each fingerprint sensor area of the plurality of fingerprint sensor areas, S being a number of successful attempts to obtain prior fingerprint image data from each of the plurality of fingerprint sensor areas and T being a total number of attempts to obtain prior fingerprint image data from each of the plurality of fingerprint sensor areas. According to some such examples, the control system may be configured to identify the selected fingerprint sensor area based, at least in part, on the success ratio. In some examples, the number of successful attempts may be a number of successful attempts during a time interval. In some such examples, the total number of attempts may be a total number of attempts during the time interval.

In some examples, the control system may be configured to identify the selected fingerprint sensor area based, at least in part, on whether the success ratio corresponding to a fingerprint sensor area equals or exceeds a success ratio threshold. In some such examples, the control system may be further configured to perform an authentication process based, at least in part, on the current fingerprint image data. In some such examples, the control system may be configured to identify the selected fingerprint sensor area based, at least in part, on a software application for which the authentication process is performed.

According to some examples, the control system may be configured to identify the selected fingerprint sensor area based, at least in part, on whether the success ratio corresponding to a fingerprint sensor area is less than or equal to a success ratio threshold. According to some such examples, the control system may be configured to not select a fingerprint sensor area if the success ratio corresponding to the fingerprint sensor area is less than or equal to the success ratio threshold.

In some examples, the control system may be configured to obtain an indication of contamination of, or damage to, a surface of the apparatus corresponding to fingerprint sensor area. In some such examples, the control system may be configured to identify the selected fingerprint sensor area based, at least in part, on the indication.

According to some examples, the fingerprint sensor system may be, or may include, an optical fingerprint sensor. According to some such examples, the control system may be configured to obtain an indication of an ambient light intensity corresponding to two or more fingerprint sensor areas and to identify the selected fingerprint sensor area based, at least in part, on the indication.

In some examples, the control system may be configured to identify the selected fingerprint sensor area based, at least in part, on user preference data.

Other innovative aspects of the subject matter described in this disclosure may be implemented in a method. In some examples, the method may involve accessing, by a control system, a data structure that includes historical fingerprint location data. In some such examples, the historical fingerprint location data may include information corresponding to prior instances of fingerprint image data obtained from each fingerprint sensor area of a plurality of fingerprint sensor areas of the fingerprint sensor system. In some examples, the method may involve identifying, by the control system and based at least in part on the historical fingerprint location data, a selected fingerprint sensor area of the plurality of fingerprint sensor areas. In some examples, the method may involve controlling, by the control system, a display to provide a visual prompt for a user to place a digit within or on the selected fingerprint sensor area. In some examples, the method may involve obtaining, by the control system and via the fingerprint sensor system, current fingerprint image data of the digit from the selected fingerprint sensor area.

In some examples, the historical fingerprint location data may indicate a number of prior instances during which prior fingerprint image data has been obtained from each fingerprint sensor area of the plurality of fingerprint sensor areas. In some such examples, the identifying may be based, at least in part, on the number of prior instances.

According to some examples, the historical fingerprint location data may indicate a success ratio S/T for each fingerprint sensor area of the plurality of fingerprint sensor areas, S being a number of successful attempts to obtain prior fingerprint image data from each of the plurality of fingerprint sensor areas and T being a total number of attempts to obtain prior fingerprint image data from each of the plurality of fingerprint sensor areas. According to some such examples, the identifying may be based, at least in part, on the success ratio. In some examples, the number of successful attempts may be a number of successful attempts during a time interval. In some examples, the total number of attempts may be a total number of attempts during the time interval.

In some examples, the identifying may be based, at least in part, on whether the success ratio corresponding to a fingerprint sensor area equals or exceeds a success ratio threshold.

According to some examples, the method may involve performing an authentication process based, at least in part, on the current fingerprint image data. In some examples, the identifying may be based, at least in part, on a software application for which the authentication process is performed. According to some examples, the identifying may be based, at least in part, on the software application and on whether the success ratio corresponding to a fingerprint sensor area equals or exceeds a success ratio threshold.

In some examples, identifying may be based, at least in part, on whether the success ratio corresponding to a fingerprint sensor area is less than or equal to a success ratio threshold. In some such examples, the method may involve not selecting a fingerprint sensor area if the success ratio corresponding to the fingerprint sensor area is less than or equal to the success ratio threshold.

According to some examples, the method may involve obtaining an indication of contamination of, or damage to, a surface of the apparatus corresponding to fingerprint sensor area. In some such examples, the method may involve identifying the selected fingerprint sensor area based, at least in part, on the indication.

In some implementations, the fingerprint sensor system may include an optical fingerprint sensor. In some such examples, the method may involve obtaining an indication of an ambient light intensity corresponding to two or more fingerprint sensor areas and identifying the selected fingerprint sensor area based, at least in part, on the indication.

According to some examples, the identifying may be based, at least in part, on user preference data.

Some or all of the operations, functions or methods described herein may be performed by one or more devices according to instructions (such as software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon. For example, the software may include instructions for controlling one or more devices to perform a method.

In some examples, the method may involve accessing, by a control system, a data structure that includes historical fingerprint location data. In some such examples, the historical fingerprint location data may include information corresponding to prior instances of fingerprint image data obtained from each fingerprint sensor area of a plurality of fingerprint sensor areas of the fingerprint sensor system. In some examples, the method may involve identifying, by the control system and based at least in part on the historical fingerprint location data, a selected fingerprint sensor area of the plurality of fingerprint sensor areas. In some examples, the method may involve controlling, by the control system, a display to provide a visual prompt for a user to place a digit within or on the selected fingerprint sensor area. In some examples, the method may involve obtaining, by the control system and via the fingerprint sensor system, current fingerprint image data of the digit from the selected fingerprint sensor area.

In some examples, the historical fingerprint location data may indicate a number of prior instances during which prior fingerprint image data has been obtained from each fingerprint sensor area of the plurality of fingerprint sensor areas. In some such examples, the identifying may be based, at least in part, on the number of prior instances.

According to some examples, the historical fingerprint location data may indicate a success ratio S/T for each fingerprint sensor area of the plurality of fingerprint sensor areas, S being a number of successful attempts to obtain prior fingerprint image data from each of the plurality of fingerprint sensor areas and T being a total number of attempts to obtain prior fingerprint image data from each of the plurality of fingerprint sensor areas. According to some such examples, the identifying may be based, at least in part, on the success ratio. In some examples, the number of successful attempts may be a number of successful attempts during a time interval. In some examples, the total number of attempts may be a total number of attempts during the time interval.

In some examples, the identifying may be based, at least in part, on whether the success ratio corresponding to a fingerprint sensor area equals or exceeds a success ratio threshold.

According to some examples, the method may involve performing an authentication process based, at least in part, on the current fingerprint image data. In some examples, the identifying may be based, at least in part, on a software application for which the authentication process is performed. According to some examples, the identifying may be based, at least in part, on the software application and on whether the success ratio corresponding to a fingerprint sensor area equals or exceeds a success ratio threshold.

In some examples, identifying may be based, at least in part, on whether the success ratio corresponding to a fingerprint sensor area is less than or equal to a success ratio threshold. In some such examples, the method may involve not selecting a fingerprint sensor area if the success ratio corresponding to the fingerprint sensor area is less than or equal to the success ratio threshold.

According to some examples, the method may involve obtaining an indication of contamination of, or damage to, a surface of the apparatus corresponding to fingerprint sensor area. In some such examples, the method may involve identifying the selected fingerprint sensor area based, at least in part, on the indication.

In some implementations, the fingerprint sensor system may include an optical fingerprint sensor. In some such examples, the method may involve obtaining an indication of an ambient light intensity corresponding to two or more fingerprint sensor areas and identifying the selected fingerprint sensor area based, at least in part, on the indication.

According to some examples, the identifying may be based, at least in part, on user preference data.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 4 shows an example of a data structure that includes historical fingerprint location data.

Like reference numbers and designations in the various drawings indicate like elements.

DETAILED DESCRIPTION

Figure 1:
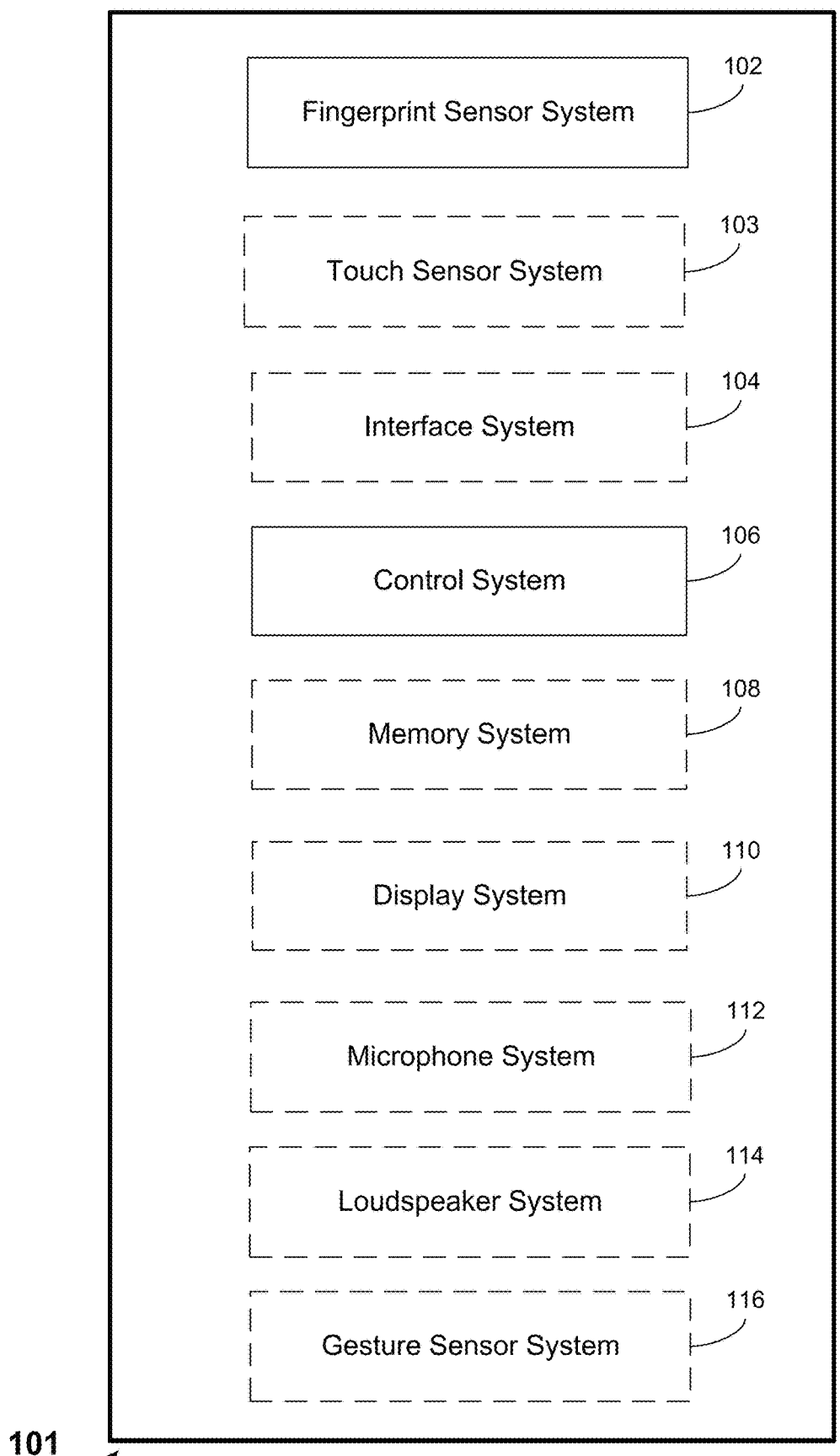
FIG. 1 is a block diagram that illustrates example components of an apparatus.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (such as e-readers), mobile health devices, computer monitors, automobile components, including but not limited to automobile displays (such as odometer and speedometer displays, etc.), cockpit controls or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

In some devices, an active region of a fingerprint sensor system may extend below a substantial portion of a mobile device's display area. In this context, the "active region" refers to an area of the fingerprint sensor system from which fingerprint image data may be obtained. For example, the active region of a mobile device's fingerprint sensor system may extend below a quarter of the mobile device's display area, half of the mobile device's display area, etc. However, during a fingerprint authentication process, users tend to place their digit(s) on the same fingerprint sensor area again and again. As used herein, a "fingerprint sensor area" refers to at least a portion of the active region of a fingerprint sensor system. In some examples, the active region may include multiple fingerprint sensor areas. In some such examples, the same fingerprint sensor area may be used again and again, while other fingerprint sensor areas are seldom used, or never used at all. Moreover, some fingerprint sensor areas may correspond with scratches, dust particles, grease, etc., on a device surface, may include one or more defective fingerprint sensor pixels, or combinations thereof. Therefore, a randomized selection of fingerprint sensor areas may not yield an optimal solution.

Some disclosed methods involve maintaining a data structure that includes historical fingerprint location data. The historical fingerprint location data may, in some examples, include information corresponding to prior instances of fingerprint image data obtained from each of a plurality of fingerprint sensor areas. Some such examples may involve identifying, based at least in part on the historical fingerprint location data, a selected fingerprint sensor area of the plurality of fingerprint sensor areas, providing a user prompt to place a digit within or on the selected fingerprint sensor area, and obtaining current fingerprint image data of the digit from the selected fingerprint sensor area.

In some examples, the historical fingerprint location data may indicate a number of prior instances during which prior fingerprint image data has been obtained from each fingerprint sensor area of the plurality of fingerprint sensor areas. In some such examples, the identifying may be based, at least in part, on the number of prior instances. According to some examples, the historical fingerprint location data may indicate a success ratio S/T for each fingerprint sensor area of the plurality of fingerprint sensor areas, S being a number of successful attempts to obtain prior fingerprint image data from each of the plurality of fingerprint sensor areas and T being a total number of attempts to obtain prior fingerprint image data from each of the plurality of fingerprint sensor areas. In some such examples, the identifying may be based, at least in part, on the success ratio. According to some such examples, the identifying may be based, at least in part, on whether the success ratio corresponding to a fingerprint sensor area equals or exceeds a success ratio threshold.

Particular implementations of the subject matter described in this disclosure may be implemented to realize one or more of the following potential advantages. In some examples, usage of fingerprint sensor areas may be more evenly distributed, which can extend the useful lifetime of a fingerprint sensor system and therefore of a device that includes the fingerprint sensor system. In some examples, fingerprint sensor areas corresponding with a high success ratio may be selected more frequently than fingerprint sensor areas corresponding with a low success ratio. According to some examples, fingerprint sensor areas corresponding with a success ratio that is at or below a threshold may be used infrequently or not at all. Similarly, fingerprint sensor areas that correspond with scratches or other damage on a device surface, or defective fingerprint sensor pixels, may be used less frequently or avoided entirely. Such examples can provide a more satisfying user experience.

FIG. 1 is a block diagram that illustrates example components of an apparatus. In this example, the apparatus 101 includes a control system 106 and a fingerprint sensor system 102. Some implementations may include a touch sensor system 103, an interface system 104, a memory system 108, a display system 110, a microphone system 112, a loudspeaker system 114, a gesture sensor system 116, or combinations thereof. Some implementations of the apparatus 101 may include an inertial sensor system. The inertial sensor system may include one or more gyroscopes, one or more accelerometers, or combinations thereof.

In some examples, the fingerprint sensor system 102 may be part of a biometric authentication system that includes a voice recognition system, a retinal scanner, a retinal scan recognition system, a face recognition system, or combinations thereof.

In some examples, the fingerprint sensor system 102 may be, or may include, a ultrasonic fingerprint sensor. Alternatively, or additionally, in some implementations the fingerprint sensor system 102 may be, or may include, an optical fingerprint sensor. In some examples, an ultrasonic version of the fingerprint sensor system 102 may include an ultrasonic receiver and a separate ultrasonic transmitter. In some such examples, the ultrasonic transmitter may include an ultrasonic plane-wave generator. However, various examples of ultrasonic fingerprint sensors are disclosed herein, some of which may include a separate ultrasonic transmitter and some of which may not. For example, in some implementations, the fingerprint sensor system 102 may include a piezoelectric receiver layer, such as a layer of polyvinylidene fluoride PVDF polymer or a layer of polyvinylidene fluoride-trifluoroethylene (PVDF-TrFE) copolymer. In some implementations, a separate piezoelectric layer may serve as the ultrasonic transmitter. In some implementations, a single piezoelectric layer may serve as both a transmitter and a receiver. The fingerprint sensor system 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, PMUT elements in a single-layer array of PMUTs or CMUT elements in a single-layer array of CMUTs may be used as ultrasonic transmitters as well as ultrasonic receivers.

Data received from a fingerprint sensor of the fingerprint sensor system 102 may sometimes be referred to herein as "fingerprint sensor data," "fingerprint image data," etc., whether or not the received data corresponds to an actual digit or another object from which the fingerprint sensor system 102 has received data. Such data will generally be received from the fingerprint sensor system in the form of electrical signals. Accordingly, without additional processing such image data would not necessarily be perceivable by a human being as an image. As noted elsewhere herein, the word "finger" as used herein may correspond to any digit, including a thumb. Accordingly, a thumbprint is a type of fingerprint.

The touch sensor system 103 (if present) may be, or may include, a resistive touch sensor system, a surface capacitive touch sensor system, a projected capacitive touch sensor system, a surface acoustic wave touch sensor system, an infrared touch sensor system, or any other suitable type of touch sensor system. In some implementations, the area of the touch sensor system 103 may extend over most or all of a display portion of the display system 110.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system 106 also may include one or more memory devices, such as one or more random access memory (RAM) devices, read-only memory (ROM) devices, etc. In this example, the control system 106 is configured for communication with, and for controlling, the fingerprint sensor system 102. In implementations where the apparatus includes a touch sensor system 103, the control system 106 is configured for communication with, and for controlling, the touch sensor system 103. In implementations where the apparatus includes a memory system 108 that is separate from the control system 106, the control system 106 also may be configured for communication with the memory system 108. In implementations where the apparatus includes a microphone system 112, the control system 106 is configured for communication with, and for controlling, the microphone system 112. In implementations where the apparatus includes a loudspeaker system 114, the control system 106 is configured for communication with, and for controlling, the loudspeaker system 114. According to some examples, the control system 106 may include one or more dedicated components for controlling the fingerprint sensor system 102, the touch sensor system 103, the memory system 108, the display system 110, the microphone system 112, or the loudspeaker system 114. In some implementations, functionality of the control system 106 may be partitioned between one or more controllers or processors, such as between a dedicated sensor controller and an applications processor of a mobile device.

In some examples, the memory system 108 may include one or more memory devices, such as one or more RAM devices, ROM devices, etc. In some implementations, the memory system 108 may include one or more computer-readable media, storage media or storage media. Computer-readable media include both computer storage media and communication media including any medium that may be enabled to transfer a computer program from one place to another. Storage media may be any available media that may be accessed by a computer. In some examples, the memory system 108 may include one or more non-transitory media. By way of example, and not limitation, non-transitory media may include RAM, ROM, electrically erasable programmable read-only memory (EEPROM), compact disc ROM (CD-ROM) or other optical disk storage, magnetic disk storage or other magnetic storage devices, or any other medium that may be used to store desired program code in the form of instructions or data structures and that may be accessed by a computer.

Some implementations of the apparatus 101 may include an interface system 104. In some examples, the interface system 104 may include a wireless interface system. In some implementations, the interface system 104 may include a user interface system, one or more network interfaces, one or more interfaces between the control system 106 and the fingerprint sensor system 102, one or more interfaces between the control system 106 and the touch sensor system 103, one or more interfaces between the control system 106 and the memory system 108, one or more interfaces between the control system 106 and the display system 110, one or more interfaces between the control system 106 and the microphone system 112, one or more interfaces between the control system 106 and the loudspeaker system 114, one or more interfaces between the control system 106 and the gesture sensor system 116, one or more interfaces between the control system 106 and one or more external device interfaces (such as ports or applications processors), or combinations thereof.

The interface system 104 may be configured to provide communication (which may include wired or wireless communication, electrical communication, radio communication, etc.) between components of the apparatus 101. In some such examples, the interface system 104 may be configured to provide communication between the control system 106 and the fingerprint sensor system 102. According to some examples, the interface system 104 may couple at least a portion of the control system 106 to the fingerprint sensor system 102 and the interface system 104 may couple at least a portion of the control system 106 to the touch sensor system 103, such as via electrically conducting material (for example, via conductive metal wires or traces). According to some examples, the interface system 104 may be configured to provide communication between the apparatus 101 and one or more other devices. In some examples, the interface system 104 may be configured to provide communication between the apparatus 101 and a human being. In some such examples, the interface system 104 may include one or more user interfaces. In some examples, the user interface(s) may be provided via the touch sensor system 103, the display system 110, the microphone system 112, the gesture sensor system 116, a haptic feedback system, or combinations thereof. Accordingly, while the interface system 104, the touch sensor system 103, the display system 110, the microphone system 112 and the gesture sensor system 116 are shown as separate elements in FIG. 1, in some implementations the interface system 104 may include one or more of these elements, other elements (such as a haptic feedback system) or combinations thereof. The interface system 104 may, in some examples, include one or more network interfaces or one or more external device interfaces (such as one or more universal serial bus (USB) interfaces or a serial peripheral interface (SPI)).

In some examples, the apparatus 101 may include a display system 110 having one or more displays. In some examples, the display system 110 may be, or may include, a light-emitting diode (LED) display, such as an organic light-emitting diode (OLED) display. In some such examples, the display system 110 may include layers, which may be referred to collectively as a "display stack."

In some implementations, the apparatus 101 may include a microphone system 112. The microphone system 112 may include one or more microphones.

According to some implementations, the apparatus 101 may include a loudspeaker system 114. The loudspeaker system 114 may include one or more loudspeakers.

In some implementations, the apparatus 101 may include a gesture sensor system 116. The gesture sensor system 116 may be, or may include, an ultrasonic gesture sensor system, an optical gesture sensor system or any other suitable type of gesture sensor system. One example of a gesture sensor system 116 is described below with reference to FIG. 7.

The apparatus 101 may be used in a variety of different contexts, some examples of which are disclosed herein. For example, in some implementations a mobile device may include at least a portion of the apparatus 101. In some implementations, a wearable device may include at least a portion of the apparatus 101. The wearable device may, for example, be a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (for example, a smartphone). In other examples, a portion of the control system 106 may reside in a local device (such as a mobile device) and another portion of the control system 106 may reside in a remote device, such as a server. The interface system 104 also may, in some such examples, reside in more than one device.

Figure 2:
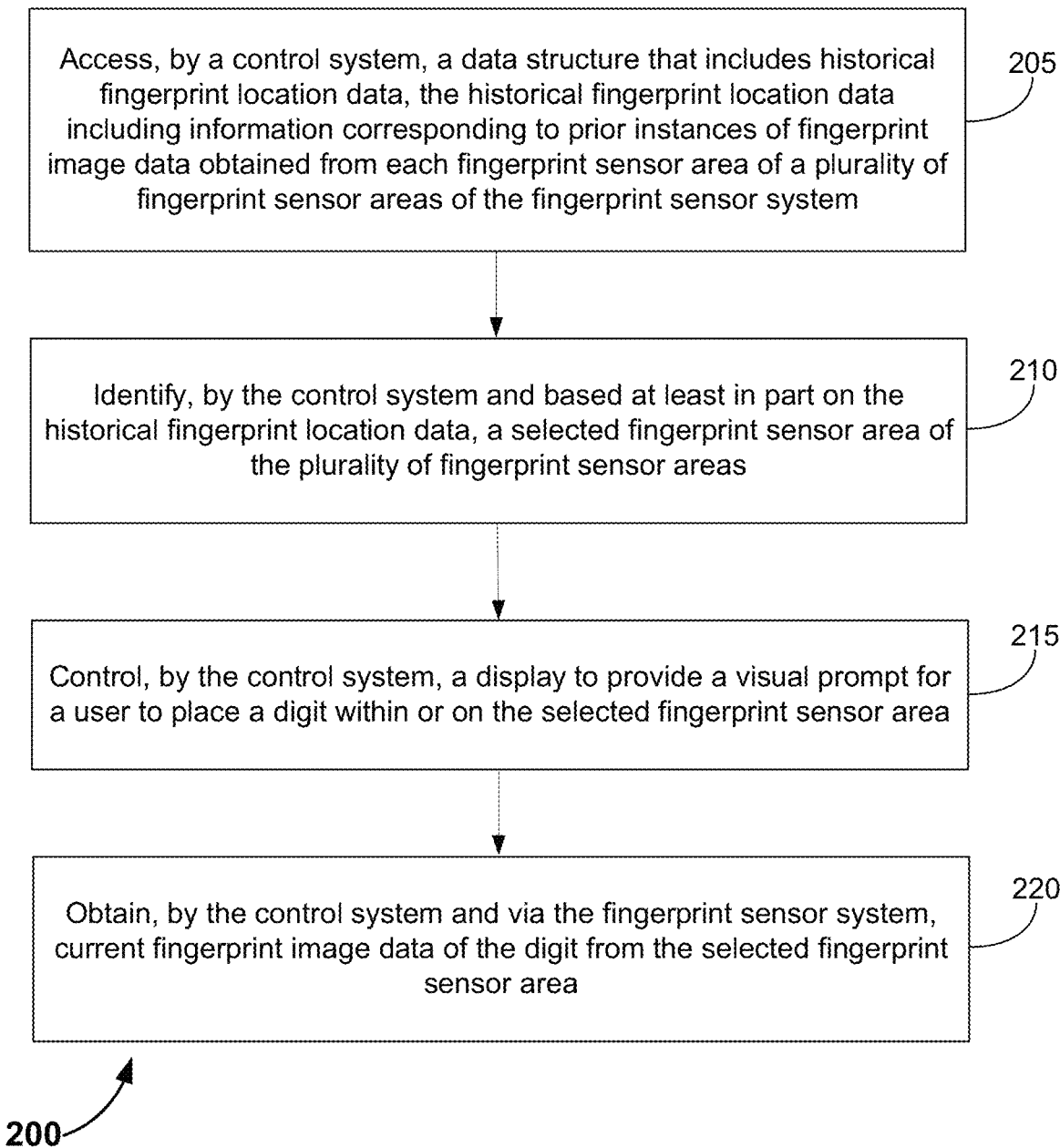
FIG. 2 is a flow diagram that presents examples of operations according to some disclosed methods.

FIG. 2 is a flow diagram that presents examples of operations according to some disclosed methods. The blocks of FIG. 2 may be performed by an apparatus that includes a display, a fingerprint sensor system and a control system. The blocks of FIG. 2 may, for example, be performed by the apparatus 101 of FIG. 1 or by a similar apparatus. For example, in some implementations the control system 106 of FIG. 1 may be configured to perform, at least in part, the operations that are described herein with reference to FIG. 2. In some examples, the apparatus may be a mobile device, such as a cellular telephone. However, in other examples, the apparatus may be another type of device, such as a tablet, a laptop, an automobile or component thereof, a wearable device, etc. As with other methods disclosed herein, the methods outlined in FIG. 2 may include more or fewer blocks than indicated. Moreover, the blocks of methods disclosed herein are not necessarily performed in the order indicated. In some implementations, one or more blocks may be performed concurrently.

In this example, block 205 involves accessing, by a control system, a data structure that includes historical fingerprint location data. The data structure may, in some implementations, be stored in a memory of the control system itself. In other implementations the data structure may be stored in a memory that is accessible by, but not part of, the control system. In this example, the historical fingerprint location data includes information corresponding to prior instances of fingerprint image data obtained from each fingerprint sensor area of a plurality of fingerprint sensor areas of the fingerprint sensor system. In some examples, the plurality of fingerprint sensor areas may include all fingerprint sensor areas of an active region of the fingerprint sensor system, whereas in other examples, the plurality of fingerprint sensor areas may only a subset of all fingerprint sensor areas of the active region.

According to this example, block 210 involves identifying, by the control system and based at least in part on the historical fingerprint location data, a selected fingerprint sensor area of the plurality of fingerprint sensor areas. In some examples, block 210 may involve identifying, by the control system and based at least in part on the historical fingerprint location data, more than one selected fingerprint sensor area. Some such examples may involve a multi-digit authentication process. In some examples, the historical fingerprint location data may indicate a number of prior instances during which prior fingerprint image data has been obtained from each fingerprint sensor area of the plurality of fingerprint sensor areas. In some such examples, block 210 may involve identifying the selected fingerprint sensor area based, at least in part, on the number of prior instances. Some such examples may involve identifying the selected fingerprint sensor area that corresponds to the smallest number of prior instances.

In other examples, block 210 may involve identifying the selected fingerprint sensor area according to one or more additional criteria, such as an indication of contamination of, or damage to, a surface of the apparatus corresponding to fingerprint sensor area. For example, if the control system determines that the fingerprint sensor area corresponding to the smallest number of prior instances also corresponds to an indication of contamination of, or damage to, a corresponding surface of the apparatus, in some examples the control system may select another fingerprint sensor area (such as a fingerprint sensor area corresponding to the second-smallest number of prior instances, the fingerprint sensor area corresponding to the smallest number of prior instances that does not correspond to contamination of, or damage to, a surface of the apparatus, etc.).

The control system may obtain an indication of contamination of, or damage to, a surface of the apparatus corresponding to fingerprint sensor area in various ways, depending on the particular implementation. In some ultrasonic fingerprint sensor implementations, an indication of contamination of, or damage to, a surface of the apparatus corresponding to fingerprint sensor area may be obtained by scanning the surface with multiple ultrasonic frequencies, multiple range gate delays, or combinations thereof. In some such implementations, the fingerprint image data resulting from such ultrasonic scans may be input to a classifier, which may be implemented by at least a portion of the control system. The classifier may, for example, be configured to identify dirt particles, dust particles, grease, oil, water droplets, scratches, cracks, or combinations thereof. The classifier may, for example, include a neural network that has been trained to identify dirt particles, dust particles, grease, oil, water droplets, scratches, cracks, or combinations thereof. In some optical fingerprint sensor implementations, fingerprint image data resulting from optical fingerprint sensor scans may be input to the classifier.

According to some examples, the historical fingerprint location data may indicate a success ratio for each fingerprint sensor area of the plurality of fingerprint sensor areas. In some examples, block 210 may involve identifying the selected fingerprint sensor area based, at least in part, on the success ratio. According to some examples, the success ratio of a fingerprint sensor area may be based, at least in part, on degradation of fingerprint sensor hardware (such as fingerprint sensor pixels) in the fingerprint sensor area. In some instances, the success ratio of a fingerprint sensor area may be based, at least in part, on contamination of, or damage to, a surface of the apparatus corresponding to the fingerprint sensor area. Accordingly, in some implementations identifying the selected fingerprint sensor area may be based on the success ratio instead of, or in addition to, an indication of contamination of, or damage to, a corresponding surface of the apparatus.

In some instances, the success ratio may be expressed as S/T, where S represents a number of successful attempts to obtain prior fingerprint image data from each of the plurality of fingerprint sensor areas and T represents a total number of attempts to obtain prior fingerprint image data from each of the plurality of fingerprint sensor areas. According to some examples, the number of successful attempts upon which a success ratio is based may be, or may include, a number of successful attempts during a time interval. According to some such examples, the total number of attempts may be, or may include, a total number of attempts during the time interval. In some examples, the historical fingerprint location data may include information corresponding to attempts to obtain prior fingerprint image data from each of the plurality of fingerprint sensor areas during one or more time intervals. For example, one time interval may correspond to the time during which the apparatus has be operational and another time interval may be a shorter time interval, such as the last week, the last two weeks, the last three weeks, the last month, the last 2 months, the last 4 months, the last 6 months, the last year, etc.

Evaluating the success ratio during different time intervals may be potentially advantageous. For example, evaluating the success ratio of a fingerprint sensor area during a recent time interval (such as the past week) may allow the control system to identify problems associated with the fingerprint sensor area that did not exist prior to the recent time interval. In one such example, a fingerprint sensor area may have suffered from hardware degradation during the past week. Alternatively, or additionally, a surface of the apparatus corresponding to the fingerprint sensor area (such as a cover glass) may have been damaged during the past week. If a recent success ratio for the fingerprint sensor area is based on a recent time interval (such as the past week, the past two weeks, etc.), the recent success ratio may more accurately predict future performance of the fingerprint sensor area. However, if the historical fingerprint location data also includes information corresponding to earlier attempts to obtain prior fingerprint image data from fingerprint sensor areas, those fingerprint sensor areas with pre-existing, longer-term problems (such as fingerprint sensor areas having low success ratios) may be seldom used or avoided. In some such examples, the recent success ratios may be based only on data corresponding to fingerprint sensor areas that have, at least until recently, provided adequate levels of performance.

In some examples, the identifying of block 210 may be based, at least in part, on whether the success ratio corresponding to a fingerprint sensor area equals or exceeds a success ratio threshold. Alternatively, the identifying of block 210 may be based, at least in part, on whether the success ratio corresponding to a fingerprint sensor area is less than or equal to a success ratio threshold. In some examples, method 200 may involve avoiding a fingerprint sensor area if the success ratio corresponding to the fingerprint sensor area is less than or equal to the success ratio threshold. In some examples, block 210 may involve not selecting a fingerprint sensor area if the success ratio corresponding to the fingerprint sensor area is less than or equal to the success ratio threshold. In some such examples, the success ratio threshold may be 55%, 60%, 65%, 70%, 75%, etc.

In some implementations, the success ratio threshold may vary over time. For example, with the passage of time, more and more fingerprint sensor areas may include degraded fingerprint sensor hardware (such as fingerprint sensor pixels), may correspond to a damaged surface of the apparatus, or combinations thereof. In such examples, the average success ratio (or another metric for evaluating the success ratio, such as the mean, the average after excluding one or more fingerprint sensor areas having the lowest success ratios, etc.) for part or all of the fingerprint sensor system may decrease. According to some implementations, if the control system determines that the average success ratio for part or all of the fingerprint sensor system has decreased, the control system may be configured to reduce a success ratio threshold required for identifying a selected fingerprint sensor area. In one such example, at a first time the average success ratio for the fingerprint sensor system may be 90%. At the first time, block 210 may involve not selecting a fingerprint sensor area if the success ratio corresponding to the fingerprint sensor area is less than or equal to a success ratio threshold of 65%, 70%, 75%, etc. However, at a second and later time, the average success ratio for the fingerprint sensor system may be 75%. At the second time, block 210 may involve not selecting a fingerprint sensor area if the success ratio corresponding to the fingerprint sensor area is less than or equal to a success ratio threshold of 55%, 60%, 65%, etc.

Accordingly, some implementations may involve determining and applying more than one success ratio threshold. In some such implementations, the success ratio threshold may change over time. Alternatively, or additionally, a relatively higher success ratio threshold or a relatively lower success ratio threshold may be applied responsive to one or more other factors, such as the type of software application that is being used or accessed, the type of information that is being accessed, etc. For example, a relatively higher success ratio threshold may be applied for accessing a payment app, a tax preparation app, a software program that provides access to confidential information, etc., than for accessing a gaming app, a music app, etc. According to some examples, the lower success ratio threshold may be 55%, 60%, 65%, 70%, 75%, etc., and the higher success ratio threshold may be 75%, 80%, 85%, 90%, 95%, etc. Accordingly, in some examples, the identifying of block 210 may be based, at least in part, on a success ratio threshold corresponding to a software application, such as a software application to which a user is currently seeking access.

In the example shown in FIG. 2, block 215 involves controlling, by the control system, a display to provide a visual prompt for a user to place a digit within or on the selected fingerprint sensor area. Various examples are disclosed herein. According to this example, block 220 involves obtaining, by the control system and via the fingerprint sensor system, current fingerprint image data of the digit from the selected fingerprint sensor area.

In some examples, method 200 may involve performing an authentication process based, at least in part, on the current fingerprint image data. According to some such examples, the identifying of block 210 may be based, at least in part, on a software application for which the authentication process is performed. In some such examples, the identifying of block 210 may be based, at least in part, on a success ratio threshold corresponding to the software application.

In some implementations, the fingerprint sensor system may be, or may include, an optical fingerprint sensor. An optical fingerprint sensor may not function as well if the ambient light is relatively bright. For example, if a bright light (such as sunlight) is impinging on some fingerprint sensor areas of the optical fingerprint sensor, these fingerprint sensor areas may not function as well as other areas on which the bright light is not impinging. Accordingly, in some examples, method 200 may involve obtaining, by the control system, an indication of an ambient light intensity corresponding to two or more fingerprint sensor areas. The indication of the ambient light intensity may, for example, be obtained from an optical sensor. The optical sensor may or may not be a part of the optical fingerprint sensor, depending on the particular implementation. In some such examples, method 200 may involve identifying the selected fingerprint sensor area based, at least in part, on the indication of the ambient light intensity.

In some such examples, the apparatus may be a foldable device. When the apparatus is folded, a first portion of the apparatus may have a first orientation and a second portion of the apparatus may have a second orientation. A first portion of the optical fingerprint sensor may reside on the first portion of the apparatus and a second portion of the optical fingerprint sensor may reside on the second portion of the apparatus. In some instances, a bright light may be impinging on the first portion of the apparatus, but not on the second portion of the apparatus, or vice versa. According to some examples, the identifying of block 210 may involve selecting a fingerprint sensor area in the portion of the optical fingerprint sensor on which the bright light is not shining.

In some examples, the identifying of block 210 may be based, at least in part, on user preference data. The user preference data may, in some examples, be received from the user, e.g., via a graphical user interface. In some examples, the user preference data may be determined according to usage data, such as input from an inertial sensor system, from the fingerprint sensor system, etc., indicating the hand with which the user normally holds the apparatus. Some examples are described herein with reference to FIG. 3.

Figure 3:
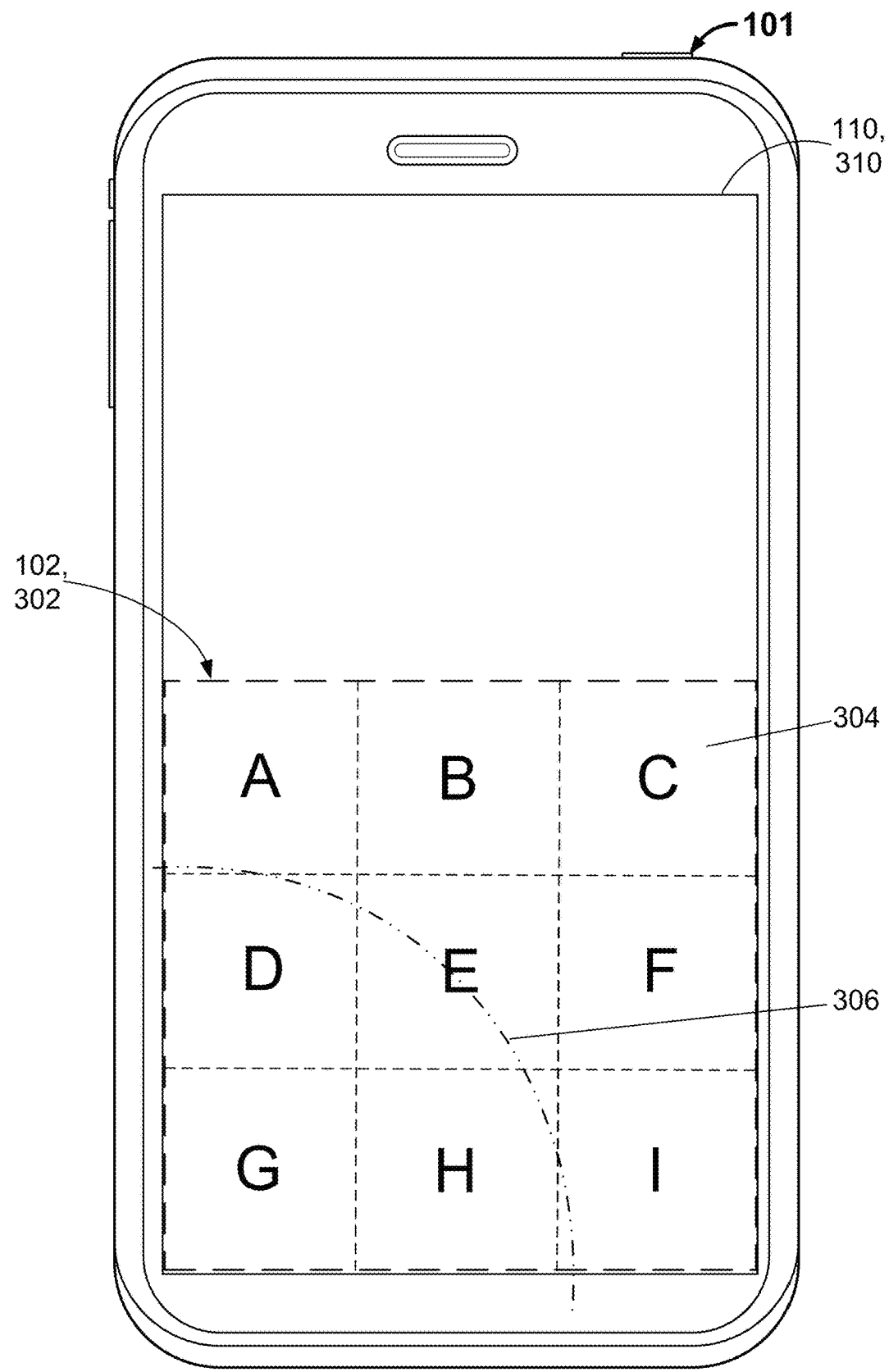
FIG. 3 shows an example of an apparatus configured to perform at least some disclosed methods.

FIG. 3 shows an example of an apparatus configured to perform at least some disclosed methods. As with other disclosed examples, the types, numbers and arrangements of elements that are shown in FIG. 3 are merely presented by way of example. Other examples may include different types of elements, numbers of elements, arrangements of elements, or combinations thereof.

In this example, the apparatus 101 is an instance of the apparatus 101 of FIG. 1. In this implementation, the apparatus 101 is a mobile device that includes a fingerprint sensor system 102, a control system 106 (not shown in FIG. 2) and a display system 110. The fingerprint sensor system 102 may be, or may include, an ultrasonic fingerprint sensor, an optical fingerprint sensor, or another type of fingerprint sensor.

According to this example, an active area 302 of the fingerprint sensor system 102 is outlined in large dashes. The active area 302 may, for example, be an area that includes an array of fingerprint sensor pixels. According to this example, the active area 302 corresponds with approximately half of the display area 310 of the display system 110. In alternative implementations, the active area 302 may correspond a larger portion or a smaller portion of the display area 310. In this example, the active area 302 includes fingerprint sensor areas A, B, C, D, E, F, G, H and I, making a total of nine fingerprint sensor areas 304. In alternative implementations, the active area 302 may include more than nine or fewer than nine fingerprint sensor areas 304, such as four fingerprint sensor areas 304, six fingerprint sensor areas 304, eight fingerprint sensor areas 304, twelve fingerprint sensor areas 304, sixteen fingerprint sensor areas 304, twenty-five fingerprint sensor areas 304, etc.

As noted above, in some examples the identifying of block 210 of FIG. 2 may be based, at least in part, on user preference data. The user preference data may, in some examples, be received from the user, e.g., via a graphical user interface presented on the display system 110. In some examples, the user preference data may be determined according to usage data, such as input from an inertial sensor system, input from the fingerprint sensor system 102, etc., indicating the hand with which the user normally holds the apparatus.

For example, the control system may determine that the user normally holds the apparatus in her left hand and normally uses her left thumb for fingerprint authentication during a single-handed operational mode. In some such examples, the identifying of block 210 may be based, at least in part, on which fingerprint sensor areas are reachable by her left thumb during a single-handed operational mode. The dashed line 306 of FIG. 3 indicates the area within which fingerprint image data corresponding with her left thumb have been received by the fingerprint sensor system 102: in this example, fingerprint image data corresponding with her left thumb have been received by fingerprint sensor areas D, G, H and portions of fingerprint sensor area E. Instances of obtaining fingerprint image data from the user's left thumb may be stored in a data structure that includes historical fingerprint location data. In some examples, the identifying of block 210 may involve selecting a fingerprint sensor area from among fingerprint sensor areas D, E, G and H. In some such examples, the identifying of block 210 may involve selecting the least-used fingerprint sensor area from among fingerprint sensor areas D, E, G and H, according to the historical fingerprint location data. Alternatively, or additionally, in some examples the identifying of block 210 may involve determining a success ratio for each of the fingerprint sensor areas D, E, G and H, and selecting the a fingerprint sensor area based, at least in part, on the success ratio.

FIG. 4 shows an example of a data structure that includes historical fingerprint location data. In this example, the data structure 400 includes historical fingerprint location data corresponding to fingerprint sensor areas A—I of FIG. 3. According to this example, each row of column 402 of the data structure 400 corresponds with one of the fingerprint sensor areas A-I. In this example, column 404 includes historical fingerprint location data regarding the total number of prior attempts to obtain fingerprint image data in each of the fingerprint sensor areas A-I, column 406 includes historical fingerprint location data regarding the number of prior successful attempts to obtain fingerprint image data in each of the fingerprint sensor areas A-I, column 408 includes historical fingerprint location data regarding the total number of prior unsuccessful attempts to obtain fingerprint image data in each of the fingerprint sensor areas A-I and column 410 includes historical fingerprint location data regarding the success ratio in prior attempts to obtain fingerprint image data in each of the fingerprint sensor areas A-I.

As with other disclosed examples, the types, numbers and arrangements of elements that are shown in FIG. 4 are merely presented by way of example. Other examples may include different types of elements, numbers of elements, arrangements of elements, or combinations thereof. For example, in some alternative implementations the data structure 400 may include either historical fingerprint location data regarding the number of prior successful attempts to obtain fingerprint image data or historical fingerprint location data regarding the total number of prior unsuccessful attempts to obtain fingerprint image data, but not both. In some examples, the data structure 400 may include historical fingerprint location data corresponding to specific digits. In some such examples, one instance of a data structure like that of the data structure 400 may be stored corresponding to each digit of a plurality of digits for which fingerprint image data have been obtained from a user during an enrollment process.

Figure 5A:
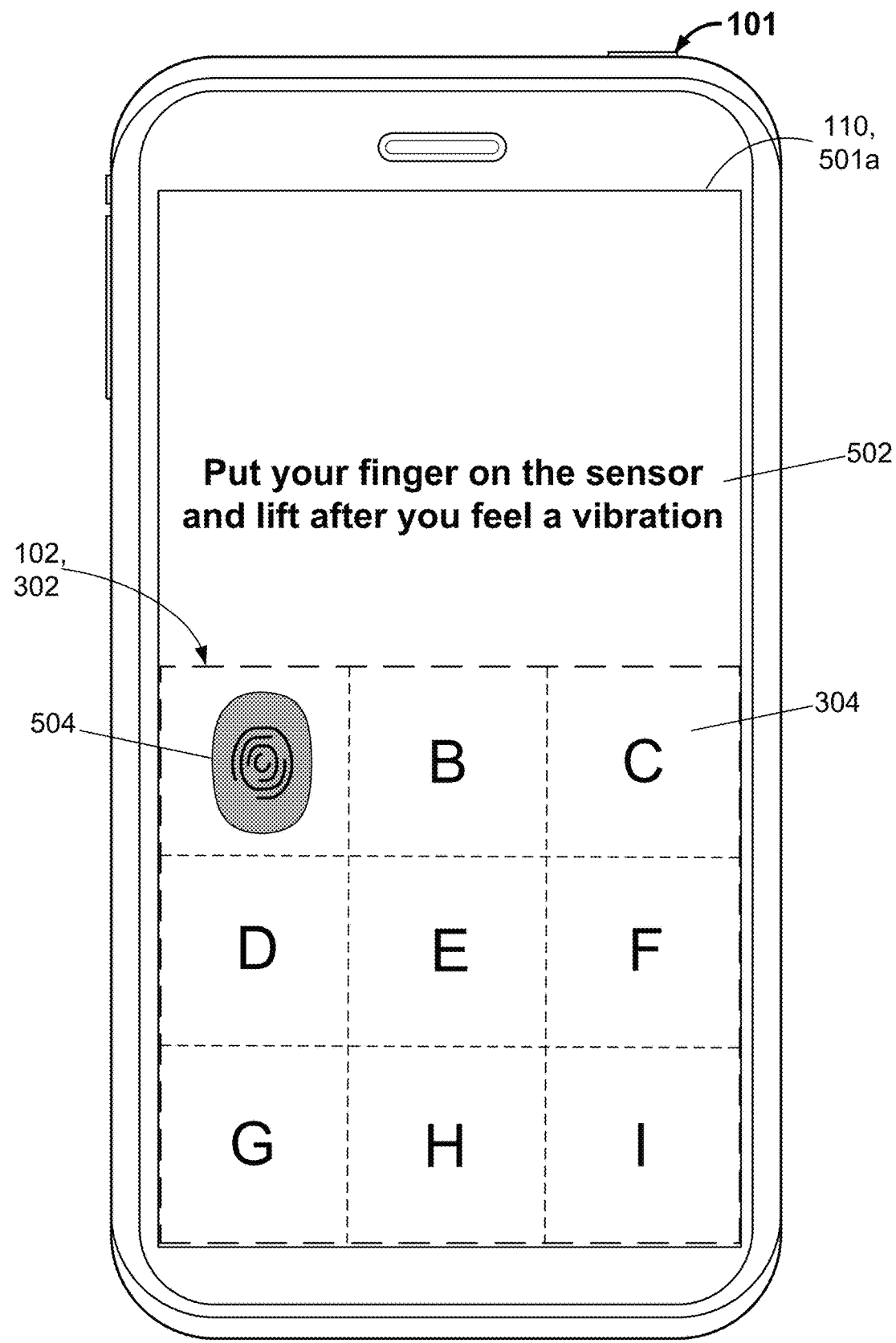
FIGS. 5A, 5B, 5C and 5D show examples of graphical user interfaces (GUIs) that may be used to implement aspects of the present disclosure.
Figure 5B:
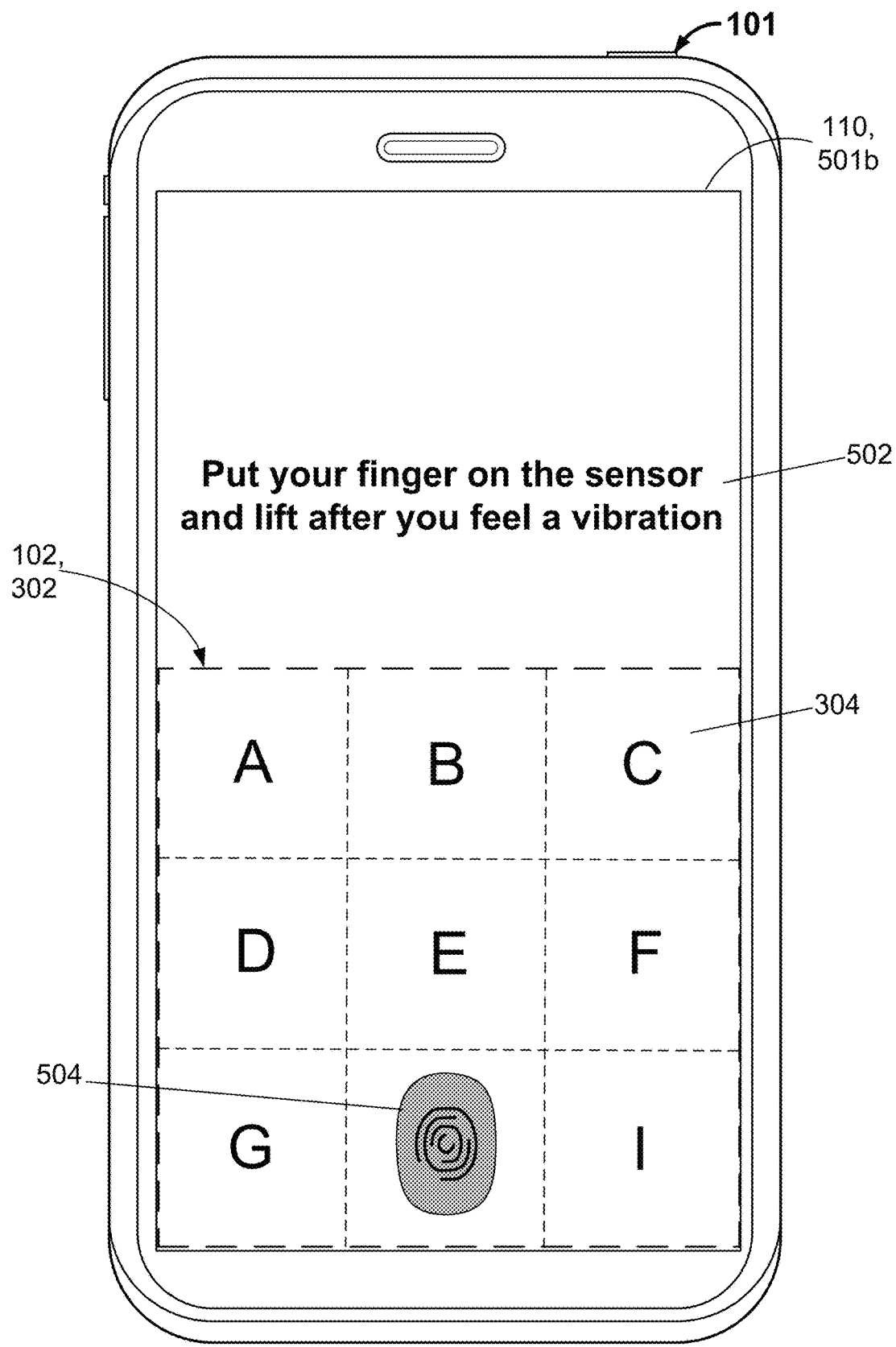
Figure 5C:
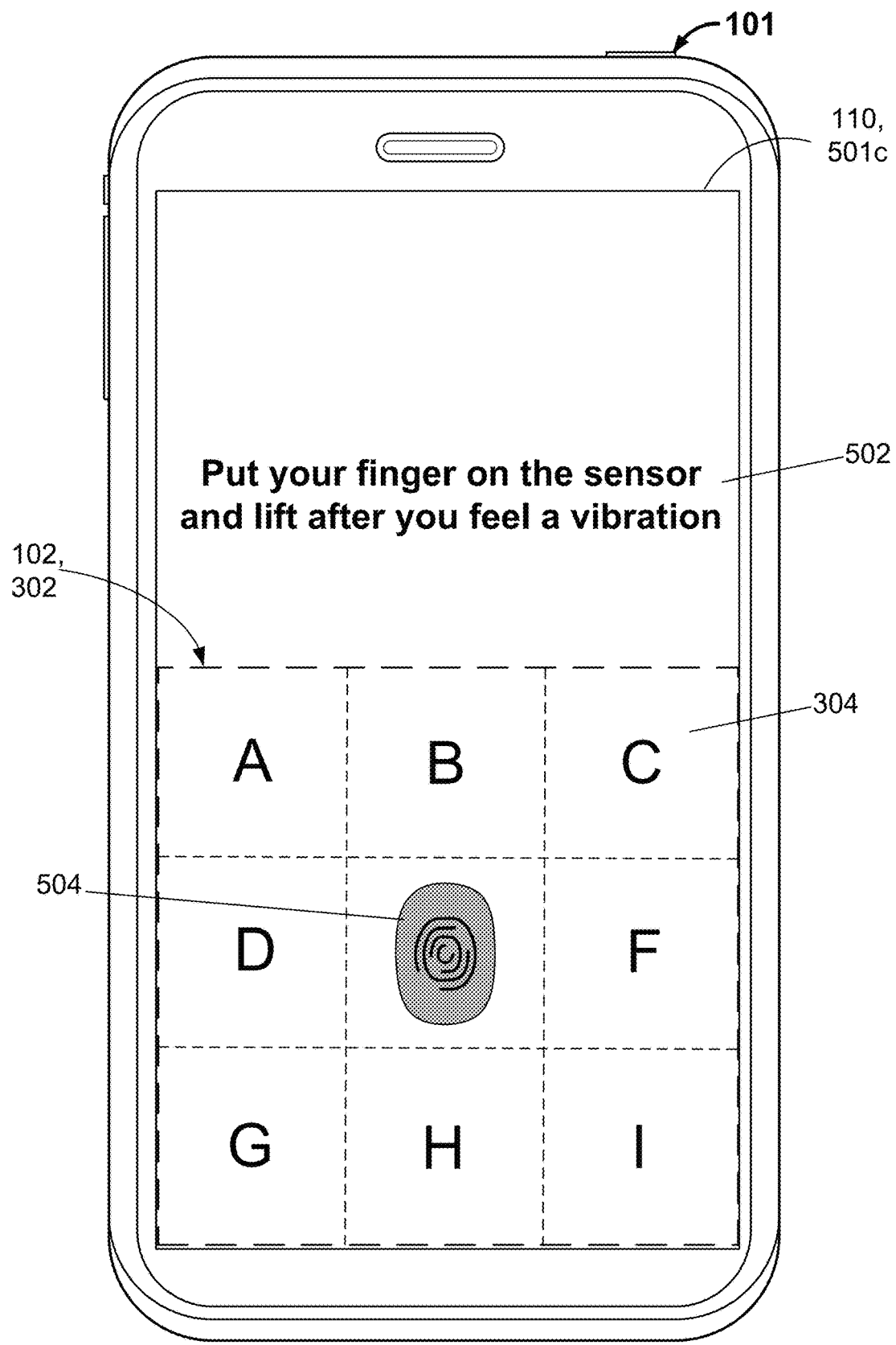

FIGS. 5A, 5B, 5C and 5D show examples of graphical user interfaces (GUIs) that may be used to implement aspects of the present disclosure. Block 215 of FIG. 2 may, in some examples, involve presenting one of the GUIs shown in FIGS. 5A, 5B and 5C, or presenting a similar GUI. In these examples, the fingerprint sensor areas A-I are shown to illustrate the relative positions of elements of the GUIs and the fingerprint sensor areas A-I. However, the fingerprint sensor areas A-I would generally not be presented as part of the GUIs. As with other disclosed examples, the types, numbers and arrangements of elements that are shown in FIGS. 5A, 5B and 5C are merely presented by way of example. Other examples may include different types of elements, numbers of elements, arrangements of elements, or combinations thereof.

FIG. 5A shows an example of a GUI 501a. In this example, GUI 501a includes a textual prompt area 502. According to this example, the textual prompt area 502 includes a message prompting a user to put a finger in the sensor and to lift the finger after the user feels a vibration. The vibration may, for example, be caused by a haptic feedback system of the apparatus 101, which may be part of the interface system 104 in some implementations. In some such examples, the control system 106 (not shown) may be configured to activate the haptic feedback system after fingerprint image data has been successfully obtained by a fingerprint sensor system 102. In some implementations, the GUI 501a may include a message specifically referencing the fingerprint icon 504 (or another such image indicating an area in which to place a digit), such as a message prompting a user to place a digit on the fingerprint icon 504. In some implementations, the GUI 501a may include a textual prompt for the user to place a particular digit (such as the right thumb, the left pinky finger, etc.) on the fingerprint icon 504.

The GUI 501a may, in some examples, be presented in accordance with block 215 of FIG. 2. In some such examples, block 210 may have involved identifying, by the control system and based at least in part on historical fingerprint location data, fingerprint sensor area A as the selected fingerprint sensor area. In some examples, fingerprint image data may be successfully obtained from the fingerprint sensor system 102 in fingerprint sensor area A. The fingerprint image data may be used in an authentication process that may, for example, be performed by the control system 106.

FIGS. 5B and 5C show examples of GUIs 501b and 501c, respectively. In these examples, GUIs 501b and 501c each include the same textual prompt area 502 that is shown in FIG. 5A. The GUIs 501b and 501c may, in some examples, be presented in accordance with block 215 of FIG. 2. In the example shown in FIG. 5B, block 210 may have involved identifying, by the control system and based at least in part on historical fingerprint location data, fingerprint sensor area H as the selected fingerprint sensor area. Accordingly, the GUI 501b shows the fingerprint icon 504 positioned in the fingerprint sensor area H. In the example shown in FIG. 5C, block 210 may have involved identifying, by the control system and based at least in part on historical fingerprint location data, fingerprint sensor area E as the selected fingerprint sensor area. Accordingly, the GUI 501c shows the fingerprint icon 504 positioned in the fingerprint sensor area E.

Figure 5D:
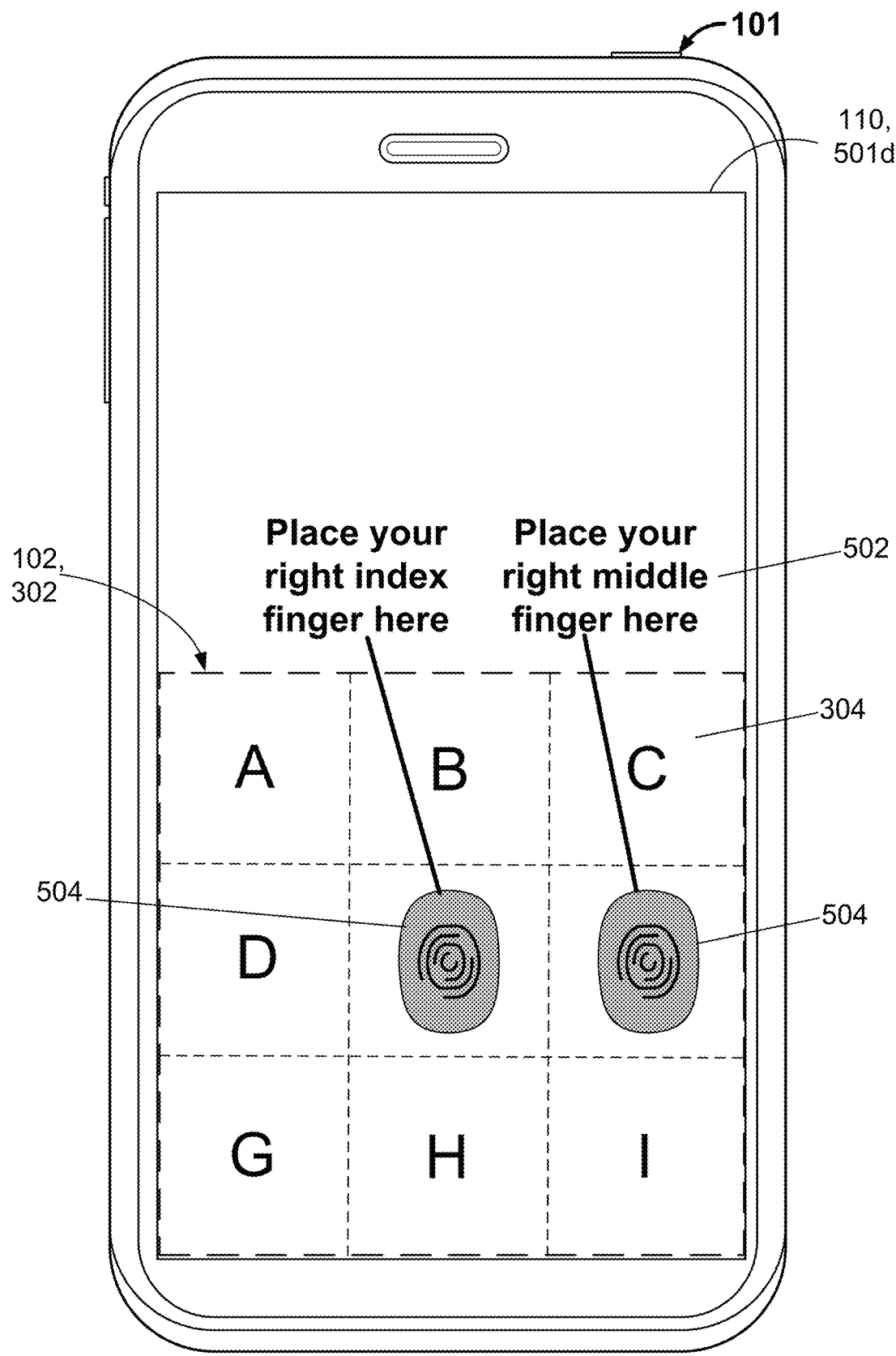

FIG. 5D shows an example of GUI 501d. The GUI 501d may, in some examples, be presented in accordance with block 215 of FIG. 2. As noted above, in some examples block 210 may involve identifying, by the control system and based at least in part on the historical fingerprint location data, more than one selected fingerprint sensor area. Some such examples may involve a multi-digit authentication process. In the example shown in FIG. 5D, block 210 involved identifying fingerprint sensor areas E and F as the selected fingerprint sensor areas for a multi-digit authentication process. Accordingly, the GUI 501b shows instances of the fingerprint icon 504 positioned in each of the fingerprint sensor areas E and F.

In this example, GUI 501d includes a different textual prompt area 502 than that shown in FIGS. 5A-5C. Here, the textual prompt area 502 indicates that the user should place a right index finger on the instance of the fingerprint icon 504 that is positioned in the fingerprint sensor area E, and that the user should place a right middle finger on the instance of the fingerprint icon 504 that is positioned in the fingerprint sensor area F.

Implementation examples are described in the following numbered clauses:

1. An apparatus, including: a display; a fingerprint sensor system; and a control system configured to: access a data structure that includes historical fingerprint location data, the historical fingerprint location data including information corresponding to prior instances of fingerprint image data obtained from each fingerprint sensor area of a plurality of fingerprint sensor areas of the fingerprint sensor system; identify, based at least in part on the historical fingerprint location data, a selected fingerprint sensor area of the plurality of fingerprint sensor areas; control the display to prompt, via at least one visual notification on the display, a user to place a digit within or on the selected fingerprint sensor area; and obtain, via the fingerprint sensor system, current fingerprint image data of the digit from the selected fingerprint sensor area.

2. The apparatus of clause 1, where the historical fingerprint location data indicates a number of prior instances during which prior fingerprint image data has been obtained from each fingerprint sensor area of the plurality of fingerprint sensor areas and where the control system is configured to identify the selected fingerprint sensor area based, at least in part, on the number of prior instances.

3. The apparatus of clause 1 or clause 2, where the historical fingerprint location data indicates a success ratio S/T for each fingerprint sensor area of the plurality of fingerprint sensor areas, S being a number of successful attempts to obtain prior fingerprint image data from each of the plurality of fingerprint sensor areas and T being a total number of attempts to obtain prior fingerprint image data from each of the plurality of fingerprint sensor areas, and where the control system is configured to identify the selected fingerprint sensor area based, at least in part, on the success ratio.

4. The apparatus of clause 3, where the control system is configured to identify the selected fingerprint sensor area based, at least in part, on whether the success ratio corresponding to a fingerprint sensor area equals or exceeds a success ratio threshold.

5. The apparatus of clause 4, where the control system is further configured to perform an authentication process based, at least in part, on the current fingerprint image data and where the control system is configured to identify the selected fingerprint sensor area based, at least in part, on a software application for which the authentication process is performed.

6. The apparatus of clause 3, where the control system is configured to identify the selected fingerprint sensor area based, at least in part, on whether the success ratio corresponding to a fingerprint sensor area is less than or equal to a success ratio threshold.

7. The apparatus of clause 6, where the control system is configured to not select a fingerprint sensor area if the success ratio corresponding to the fingerprint sensor area is less than or equal to the success ratio threshold.

8. The apparatus of any one of clauses 3-7, where the number of successful attempts is a number of successful attempts during a time interval.

9. The apparatus of clause 8, where the total number of attempts is a total number of attempts during the time interval.

10. The apparatus of any one of clauses 1-9, where the control system is further configured to: obtain an indication of contamination of, or damage to, a surface of the apparatus corresponding to fingerprint sensor area; and identify the selected fingerprint sensor area based, at least in part, on the indication.

11. The apparatus of any one of clauses 1-10, where the fingerprint sensor system is, or includes, an optical fingerprint sensor and where the control system is further configured to: obtain an indication of an ambient light intensity corresponding to two or more fingerprint sensor areas; and identify the selected fingerprint sensor area based, at least in part, on the indication.

12. The apparatus of any one of clauses 1-11, where the control system is configured to identify the selected fingerprint sensor area based, at least in part, on user preference data.

13. A method of controlling an apparatus that includes a fingerprint sensor system, the method including: accessing, by a control system, a data structure that includes historical fingerprint location data, the historical fingerprint location data including information corresponding to prior instances of fingerprint image data obtained from each fingerprint sensor area of a plurality of fingerprint sensor areas of the fingerprint sensor system; identifying, by the control system and based at least in part on the historical fingerprint location data, a selected fingerprint sensor area of the plurality of fingerprint sensor areas; controlling, by the control system, a display to provide a visual prompt for a user to place a digit within or on the selected fingerprint sensor area; and obtaining, by the control system and via the fingerprint sensor system, current fingerprint image data of the digit from the selected fingerprint sensor area.

14. The method of clause 13, where the historical fingerprint location data indicates a number of prior instances during which prior fingerprint image data has been obtained from each fingerprint sensor area of the plurality of fingerprint sensor areas and where the identifying is based, at least in part, on the number of prior instances.

15. The method of clause 13 or clause 14, where the historical fingerprint location data indicates a success ratio S/T for each fingerprint sensor area of the plurality of fingerprint sensor areas, S being a number of successful attempts to obtain prior fingerprint image data from each of the plurality of fingerprint sensor areas and T being a total number of attempts to obtain prior fingerprint image data from each of the plurality of fingerprint sensor areas, and where the identifying is based, at least in part, on the success ratio.

16. The method of clause 15, where the identifying is based, at least in part, on whether the success ratio corresponding to a fingerprint sensor area equals or exceeds a success ratio threshold.

17. The method of clause 16, further including performing an authentication process based, at least in part, on the current fingerprint image data and where the identifying is based, at least in part, on a software application for which the authentication process is performed.

18. The method of clause 15, where the identifying is based, at least in part, on whether the success ratio corresponding to a fingerprint sensor area is less than or equal to a success ratio threshold.

19. The method of clause 18, where the method involves not selecting a fingerprint sensor area if the success ratio corresponding to the fingerprint sensor area is less than or equal to the success ratio threshold.

20. The method of any one of clauses 15-19, where the number of successful attempts is a number of successful attempts during a time interval.

21. The method of clause 20, where the total number of attempts is a total number of attempts during the time interval.

22. The method of any one of clauses 13-21, further including: obtaining an indication of contamination of, or damage to, a surface of the apparatus corresponding to fingerprint sensor area; and identifying the selected fingerprint sensor area based, at least in part, on the indication.

23. The method of any one of clauses 13-22, where the fingerprint sensor system is, or includes, an optical fingerprint sensor and where the method further involves: obtaining an indication of an ambient light intensity corresponding to two or more fingerprint sensor areas; and identifying the selected fingerprint sensor area based, at least in part, on the indication.

24. The method of any one of clauses 13-23, where the identifying is based, at least in part, on user preference data.

25. One or more non-transitory media having software stored thereon, the software including instructions for controlling an apparatus that includes a fingerprint sensor system to perform a method, the method including: accessing, by a control system, a data structure that includes historical fingerprint location data, the historical fingerprint location data including information corresponding to prior instances of fingerprint image data obtained from each fingerprint sensor area of a plurality of fingerprint sensor areas of the fingerprint sensor system; identifying, by the control system and based at least in part on the historical fingerprint location data, a selected fingerprint sensor area of the plurality of fingerprint sensor areas; controlling, by the control system, a display to provide a visual prompt for a user to place a digit within or on the selected fingerprint sensor area; and obtaining, by the control system and via the fingerprint sensor system, current fingerprint image data of the digit from the selected fingerprint sensor area.

26. The one or more non-transitory media of clause 25, where the historical fingerprint location data indicates a number of prior instances during which prior fingerprint image data has been obtained from each fingerprint sensor area of the plurality of fingerprint sensor areas and where the identifying is based, at least in part, on the number of prior instances.

27. The one or more non-transitory media of clause 25 or clause 26, where the historical fingerprint location data indicates a success ratio S/T for each fingerprint sensor area of the plurality of fingerprint sensor areas, S being a number of successful attempts to obtain prior fingerprint image data from each of the plurality of fingerprint sensor areas and T being a total number of attempts to obtain prior fingerprint image data from each of the plurality of fingerprint sensor areas, and where the identifying is based, at least in part, on the success ratio.

28. The one or more non-transitory media of clause 27, where the identifying is based, at least in part, on whether the success ratio corresponding to a fingerprint sensor area equals or exceeds a success ratio threshold.

29. An apparatus, including: a display; a fingerprint sensor system; and control means for: accessing a data structure that includes historical fingerprint location data, the historical fingerprint location data including information corresponding to prior instances of fingerprint image data obtained from each fingerprint sensor area of a plurality of fingerprint sensor areas of the fingerprint sensor system; identifying, based at least in part on the historical fingerprint location data, a selected fingerprint sensor area of the plurality of fingerprint sensor areas; controlling the display to prompt, via at least one visual notification on the display, a user to place a digit within or on the selected fingerprint sensor area; and obtaining, via the fingerprint sensor system, current fingerprint image data of the digit from the selected fingerprint sensor area.

30. The apparatus of clause 29, where the historical fingerprint location data indicates a number of prior instances during which prior fingerprint image data has been obtained from each fingerprint sensor area of the plurality of fingerprint sensor areas and where the identifying is based, at least in part, on the number of prior instances.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations presented herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order presented or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. An apparatus, comprising:
   a display;
   a fingerprint sensor system; and
   a control system configured to:
   access a data structure that includes historical fingerprint location data, the historical fingerprint location data including information corresponding to prior instances of fingerprint image data obtained from each fingerprint sensor area of a plurality of fingerprint sensor areas of the fingerprint sensor system, wherein the historical fingerprint location data indicates a success ratio S/T for each fingerprint sensor area of the plurality of fingerprint sensor areas, S being a number of successful attempts to obtain prior fingerprint image data from each of the plurality of fingerprint sensor areas and T being a total number of attempts to obtain prior fingerprint image data from each of the plurality of fingerprint sensor areas;
   identify, based at least in part on the historical fingerprint location data, a selected fingerprint sensor area of the plurality of fingerprint sensor areas, wherein the control system is configured to identify the selected fingerprint sensor area based, at least in part, on the success ratio;
   control the display to prompt, via at least one visual notification on the display, a user to place a digit within or on the selected fingerprint sensor area; and
   obtain, via the fingerprint sensor system, current fingerprint image data of the digit from the selected fingerprint sensor area.

2. The apparatus of claim 1, wherein the historical fingerprint location data indicates a number of prior instances during which prior fingerprint image data has been obtained from each fingerprint sensor area of the plurality of fingerprint sensor areas and wherein the control system is configured to identify the selected fingerprint sensor area based, at least in part, on the number of prior instances.

3. The apparatus of claim 1, wherein the control system is configured to identify the selected fingerprint sensor area based, at least in part, on whether the success ratio corresponding to a fingerprint sensor area equals or exceeds a success ratio threshold.

4. The apparatus of claim 3, wherein the control system is further configured to perform an authentication process based, at least in part, on the current fingerprint image data and wherein the control system is configured to identify the selected fingerprint sensor area based, at least in part, on a software application for which the authentication process is performed.

5. The apparatus of claim 1, wherein the control system is configured to identify the selected fingerprint sensor area based, at least in part, on whether the success ratio corresponding to a fingerprint sensor area is less than or equal to a success ratio threshold.

6. The apparatus of claim 5, wherein the control system is configured to not select a fingerprint sensor area if the success ratio corresponding to the fingerprint sensor area is less than or equal to the success ratio threshold.

7. The apparatus of claim 1, wherein the number of successful attempts comprises a number of successful attempts during a time interval.

8. The apparatus of claim 7, wherein the total number of attempts comprises a total number of attempts during the time interval.

9. The apparatus of claim 1, wherein the control system is further configured to:
obtain an indication of contamination of, or damage to, a surface of the apparatus corresponding to fingerprint sensor area; and
identify the selected fingerprint sensor area based, at least in part, on the indication.

10. The apparatus of claim 1, wherein the fingerprint sensor system comprises an optical fingerprint sensor and wherein the control system is further configured to:
obtain an indication of an ambient light intensity corresponding to two or more fingerprint sensor areas; and
identify the selected fingerprint sensor area based, at least in part, on the indication.

11. The apparatus of claim 1, wherein the control system is configured to identify the selected fingerprint sensor area based, at least in part, on user preference data.

12. A method of controlling an apparatus that includes a fingerprint sensor system, the method comprising:
accessing, by a control system, a data structure that includes historical fingerprint location data, the historical fingerprint location data including information corresponding to prior instances of fingerprint image data obtained from each fingerprint sensor area of a plurality of fingerprint sensor areas of the fingerprint sensor system, wherein the historical fingerprint location data indicates a success ratio S/T for each fingerprint sensor area of the plurality of fingerprint sensor areas, S being a number of successful attempts to obtain prior fingerprint image data from each of the plurality of fingerprint sensor areas and T being a total number of attempts to obtain prior fingerprint image data from each of the plurality of fingerprint sensor areas;
identifying, by the control system and based at least in part on the historical fingerprint location data, a selected fingerprint sensor area of the plurality of fingerprint sensor areas, wherein the identifying is based, at least in part, on the success ratio;
controlling, by the control system, a display to provide a visual prompt for a user to place a digit within or on the selected fingerprint sensor area; and
obtaining, by the control system and via the fingerprint sensor system, current fingerprint image data of the digit from the selected fingerprint sensor area.

13. The method of claim 12, wherein the historical fingerprint location data indicates a number of prior instances during which prior fingerprint image data has been obtained from each fingerprint sensor area of the plurality of fingerprint sensor areas and wherein the identifying is based, at least in part, on the number of prior instances.

14. The method of claim 12, wherein the identifying is based, at least in part, on whether the success ratio corresponding to a fingerprint sensor area equals or exceeds a success ratio threshold.

15. The method of claim 14, further comprising performing an authentication process based, at least in part, on the current fingerprint image data and wherein the identifying is based, at least in part, on a software application for which the authentication process is performed.

16. The method of claim 12, wherein the identifying is based, at least in part, on whether the success ratio corresponding to a fingerprint sensor area is less than or equal to a success ratio threshold.

17. The method of claim 16, wherein the method involves not selecting a fingerprint sensor area if the success ratio corresponding to the fingerprint sensor area is less than or equal to the success ratio threshold.

18. The method of claim 12, wherein the number of successful attempts comprises a number of successful attempts during a time interval.

19. The method of claim 18, wherein the total number of attempts comprises a total number of attempts during the time interval.

20. The method of claim 12, further comprising:
obtaining an indication of contamination of, or damage to, a surface of the apparatus corresponding to fingerprint sensor area; and
identifying the selected fingerprint sensor area based, at least in part, on the indication.

21. The method of claim 12, wherein the fingerprint sensor system comprises an optical fingerprint sensor and wherein the method further comprises:
obtaining an indication of an ambient light intensity corresponding to two or more fingerprint sensor areas; and
identifying the selected fingerprint sensor area based, at least in part, on the indication.

22. The method of claim 12, wherein the identifying is based, at least in part, on user preference data.

23. One or more non-transitory media having software stored thereon, the software including instructions for controlling an apparatus that includes a fingerprint sensor system to perform a method, the method comprising:
accessing, by a control system, a data structure that includes historical fingerprint location data, the historical fingerprint location data including information corresponding to prior instances of fingerprint image data obtained from each fingerprint sensor area of a plurality of fingerprint sensor areas of the fingerprint sensor system, wherein the historical fingerprint location data indicates a success ratio S/T for each fingerprint sensor area of the plurality of fingerprint sensor areas, S being a number of successful attempts to obtain prior fingerprint image data from each of the plurality of fingerprint sensor areas and T being a total number of attempts to obtain prior fingerprint image data from each of the plurality of fingerprint sensor areas;

identifying, by the control system and based at least in part on the historical fingerprint location data, a selected fingerprint sensor area of the plurality of fingerprint sensor areas, wherein the identifying is based, at least in part, on the success ratio;

controlling, by the control system, a display to provide a visual prompt for a user to place a digit within or on the selected fingerprint sensor area; and obtaining, by the control system and via the fingerprint sensor system, current fingerprint image data of the digit from the selected fingerprint sensor area.

24. The one or more non-transitory media of claim 23, wherein the historical fingerprint location data indicates a number of prior instances during which prior fingerprint image data has been obtained from each fingerprint sensor area of the plurality of fingerprint sensor areas and wherein the identifying is based, at least in part, on the number of prior instances.

25. The one or more non-transitory media of claim 23, wherein the identifying is based, at least in part, on whether the success ratio corresponding to a fingerprint sensor area equals or exceeds a success ratio threshold.

26. An apparatus, comprising:
a display;
a fingerprint sensor system; and
control means for:
   accessing a data structure that includes historical fingerprint location data, the historical fingerprint location data including information corresponding to prior instances of fingerprint image data obtained from each fingerprint sensor area of a plurality of fingerprint sensor areas of the fingerprint sensor system, wherein the historical fingerprint location data indicates a success ratio S/T for each fingerprint sensor area of the plurality of fingerprint sensor areas, S being a number of successful attempts to obtain prior fingerprint image data from each of the plurality of fingerprint sensor areas and T being a total number of attempts to obtain prior fingerprint image data from each of the plurality of fingerprint sensor areas;
   identifying, based at least in part on the historical fingerprint location data, a selected fingerprint sensor area of the plurality of fingerprint sensor areas, wherein the identifying is based, at least in part, on the success ratio;
   controlling the display to prompt, via at least one visual notification on the display, a user to place a digit within or on the selected fingerprint sensor area; and
   obtaining, via the fingerprint sensor system, current fingerprint image data of the digit from the selected fingerprint sensor area.

27. The apparatus of claim 26, wherein the historical fingerprint location data indicates a number of prior instances during which prior fingerprint image data has been obtained from each fingerprint sensor area of the plurality of fingerprint sensor areas and wherein the identifying is based, at least in part, on the number of prior instances.

* * * * *